Feb. 24, 1953     A. J. BRIGGS     2,629,159
POTTERY WARE JIGGER

Filed Aug. 18, 1949     7 Sheets-Sheet 1

INVENTOR.
ARTHUR J. BRIGGS
BY Bodell & Thompson
Attorneys.

Feb. 24, 1953 A. J. BRIGGS 2,629,159
POTTERY WARE JIGGER
Filed Aug. 18, 1949 7 Sheets-Sheet 3

INVENTOR.
ARTHUR J. BRIGGS
BY Bodell & Thompson
Attorneys.

Feb. 24, 1953 A. J. BRIGGS 2,629,159
POTTERY WARE JIGGER
Filed Aug. 18, 1949 7 Sheets-Sheet 4

INVENTOR.
ARTHUR J. BRIGGS
BY Bodell + Thompson
Attorneys.

INVENTOR.
ARTHUR J. BRIGGS
BY Bodell + Thompson
Attorneys.

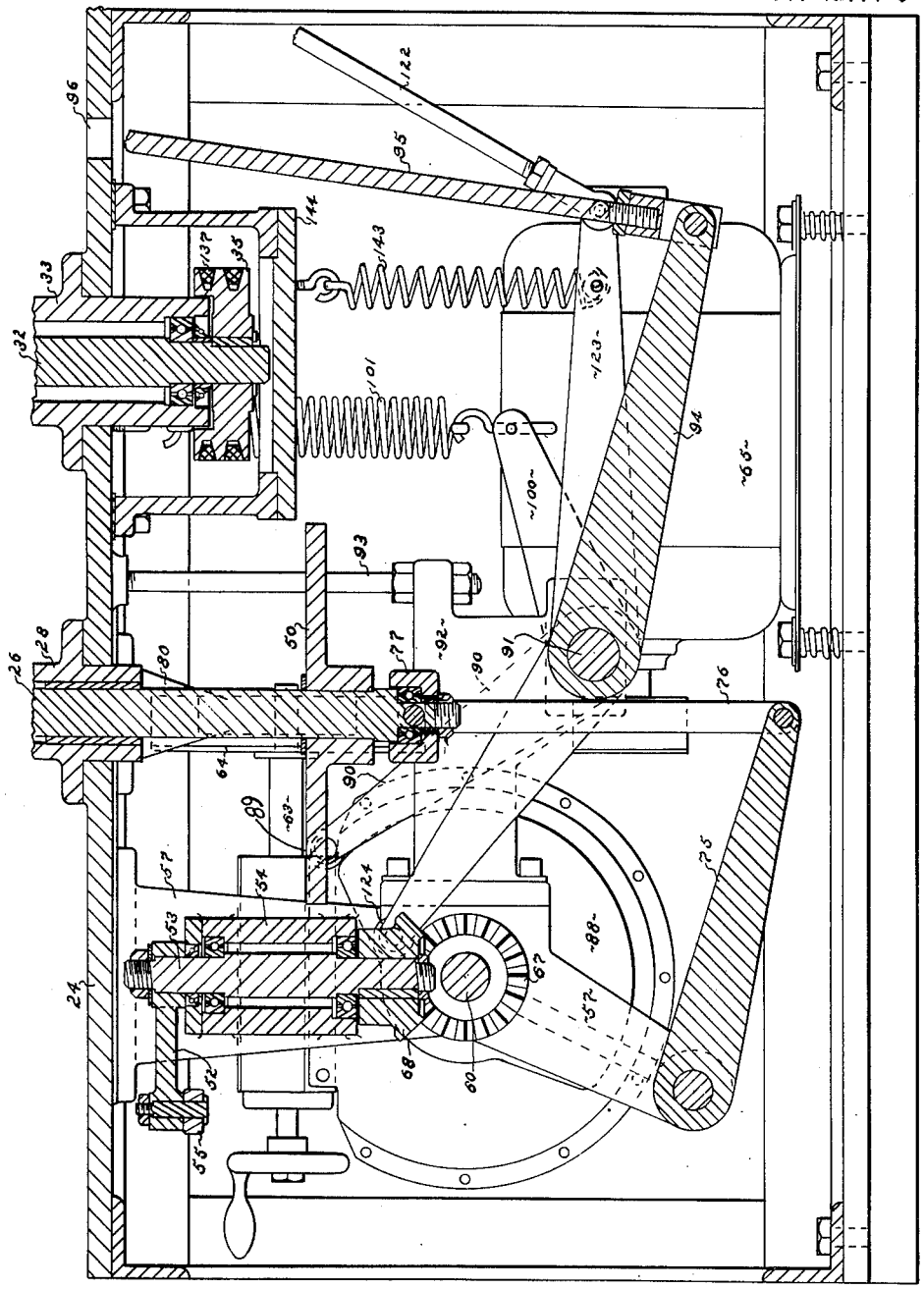

Feb. 24, 1953        A. J. BRIGGS        2,629,159
POTTERY WARE JIGGER
Filed Aug. 18, 1949                            7 Sheets-Sheet 7
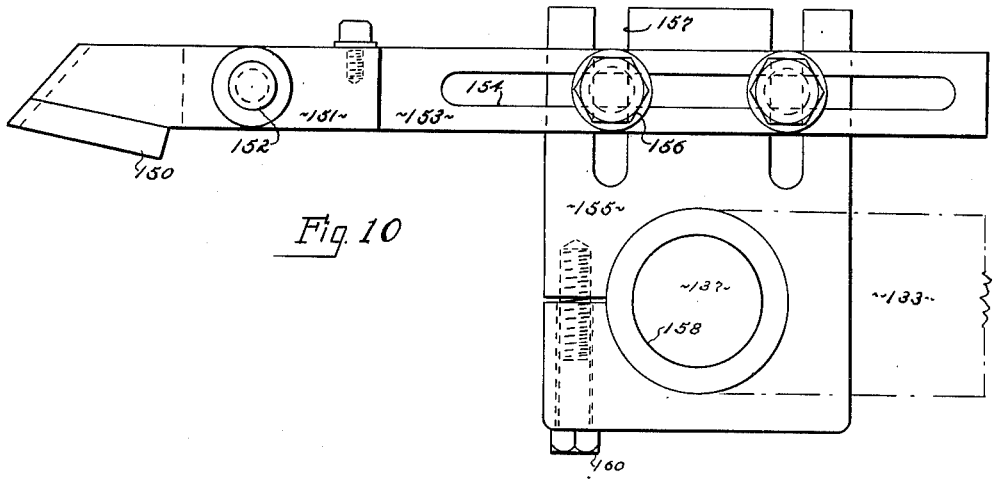
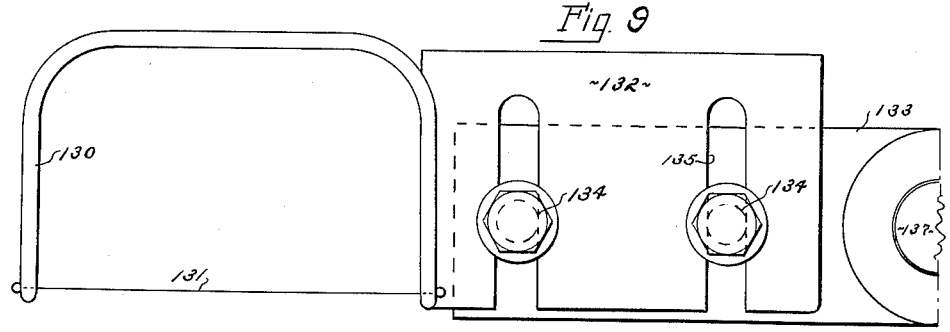
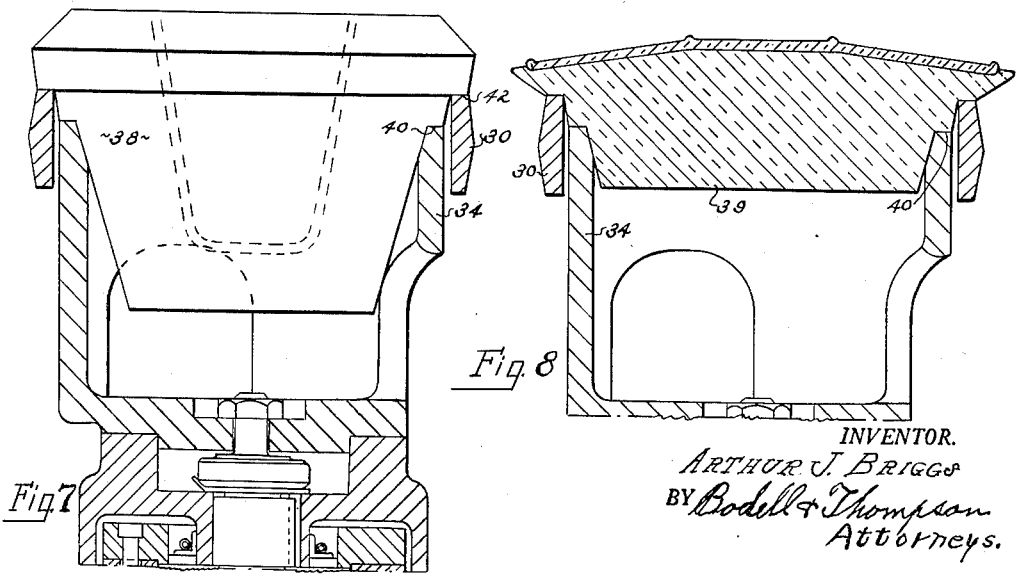
INVENTOR.
ARTHUR J. BRIGGS
BY Bodell & Thompson
Attorneys.

Patented Feb. 24, 1953

2,629,159

UNITED STATES PATENT OFFICE 2,629,159

POTTERY WARE JIGGER

Arthur J. Briggs, Sutton, Vt., assignor to Onondaga Pottery Company, Syracuse, N. Y., a corporation of New York Application August 18, 1949, Serial No. 111,032

6 Claims. (Cl. 25—24)

This invention relates to jiggering machines for forming pottery ware. More specifically, the invention has to do with a jigger wherein the absorbent moulds on which the ware is formed are automatically transferred to and removed from the jigger chuck by an intermittently indexed mould carrying turret.

The invention has as an object a jigger of the type referred to embodying a particularly compact structure composed of sub-assemblies readily removable as a unit to facilitate repair or replacement of parts.

The invention has as a further object a machine of the type referred to wherein the jigger spindle is restrained against axial movement and the turret is actuated vertically to deposit moulds on and remove moulds from the spindle, whereby the spindle may be mounted with greater rigidly and precision, resulting in the production of high class china pottery ware.

The invention has as a further object a particularly simple and rugged structure for restraining the turret against rotation except when it has been moved to elevated position.

The invention has as a further object a machine of the type referred to embodying mechanism for removing waste or scrap material from the mould at the end of the jiggering operation, which mechanism is actuated independently of the forming tool.

The invention consists in the novel features and in the combinations and constructions hereinafter set forth and claimed.

In describing this invention, reference is had to the accompanying drawings in which like characters designate corresponding parts in all the views.

Figure 6 is a sectional view of the cabinet and mechanism mounted therein taken on a line corresponding to line 6—6, Figure 4.

Figure 7 is a sectional view of the jigger spindle chuck taken on a line corresponding to line 7—7, Figure 1, illustrating a hollow ware mould positioned in the chuck.

Figure 8 is a view, similar to Figure 7, showing a flat ware mould positioned in the chuck.

Figure 9 is a side elevational view of a scrapper used in conjunction with a hollow ware mould.

Figure 10 is a similar view of a scrapper used in conjunction with a flat ware mould.

Figure 11 is a sectional view of the tool arm stop structure.

Figure 1:
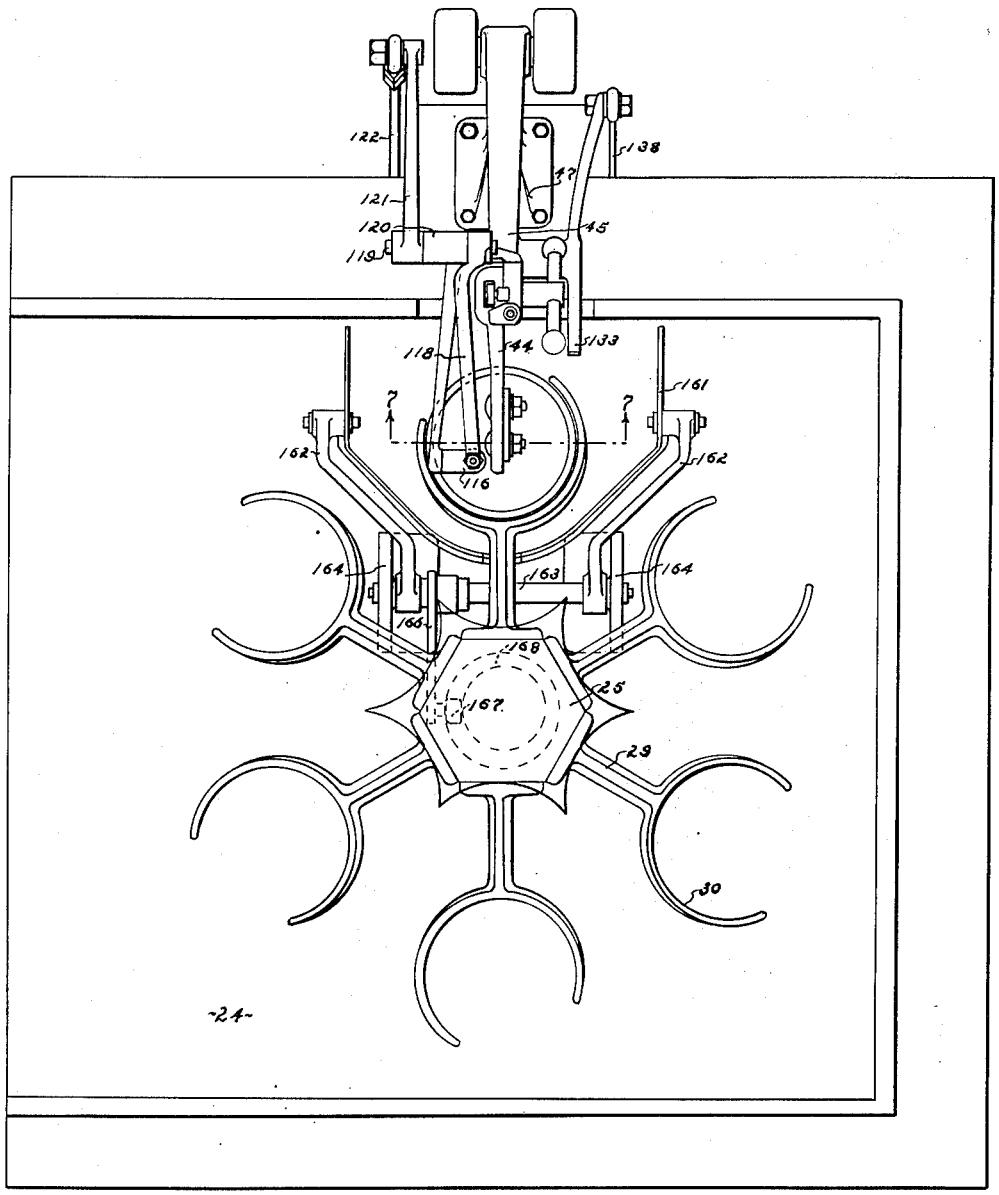
Figure 1 is a top plan view of the machine embodying my invention.

The machine consists of a frame structure in the form of an enclosed cabinet having vertically extending corner posts 20 mounted on a rectangular base 21 and having top and bottom horizontally extending rails 22, 23. The cabinet is closed by a top plate 24. A mould carrying turret 25 is affixed to the upper end of a shaft 26, Figure 6, journalled vertically in the center of the top plate 24 in a bearing supporting member 28 extending upwardly therefrom. This turret is provided with a plurality of mould carrying members adapted to releasably support moulds. These members consist of arms 29, Figure 1, extending radially from the turret and terminating in a forked structure 30.

At one side of the shaft 26 there is journalled a jigger spindle 32, Figure 6, and a supporting sleeve 33 mounted on the top plate 24 and extending upwardly therefrom. The spindle 32 has affixed to its upper end a mould receiving chuck 34, Figure 5. A sheave 35 is affixed to the lower end of the spindle and is operatively connected to a driving motor 36, Figure 2, as by belts 37, to effect rotation of the spindle during the jiggering operation. The chuck 34, Figures 7 and 8, is substantially of cylindrical formation and is adapted to receive moulds 38 for forming hollow ware, or moulds 39 for forming flatware, the upper edge of the chuck engaging a shoulder 40 formed on the moulds, and the upper portion of the inner surface of the chuck is tapered to receive the complemental taper formed on the body portions of the moulds. The forked portion 30 of each mould carrying member is adapted to engage a shoulder 42 formed on the moulds 38, 39, and spaced radially outwardly from the shoulders 40. The purpose of the outer shoulder 42 is to provide a surface for engagement by the mould carrying members other than the shoulders 40, so that the latter will not be likely to become damaged. This preserves the accuracy of the shoulders 40 and aids in jiggering or forming the ware on the moulds with greater precision.

Figure 5:
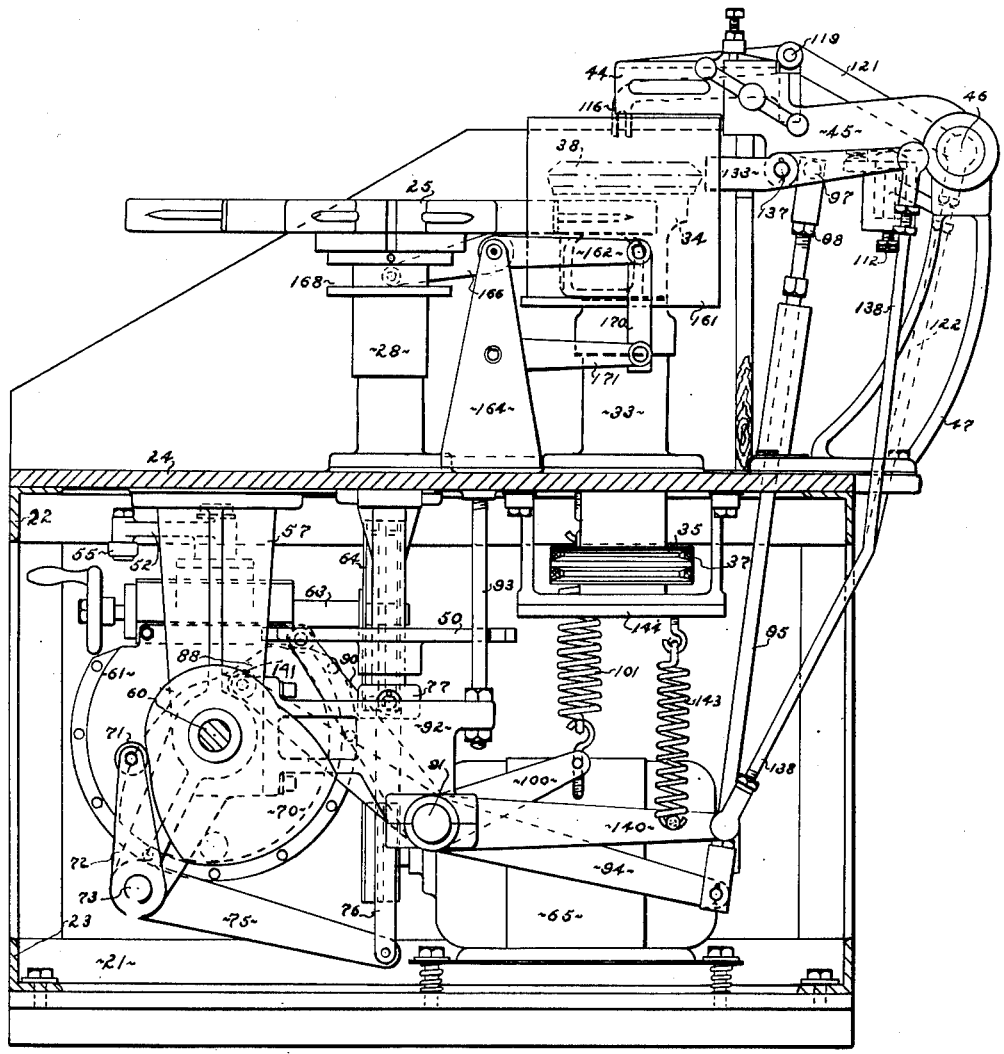
Figure 5 is a view taken on line 5—5, Figure 2.

The exposed surface of the clay or plastic material carried by the moulds is tooled to final form by a tool of the proper contour detachably secured to a forwardly extending portion 44, Figure 5, of a tooling arm 45 pivoted, as at 46 to a bracket 47 extending upwardly from the top plate 24.

The shaft 26 and the turret 25 carried thereby is intermittently indexed to successively move the forked portions 30 of the mould carrying members into axial registration with the jigger chuck 34.

Figure 4:
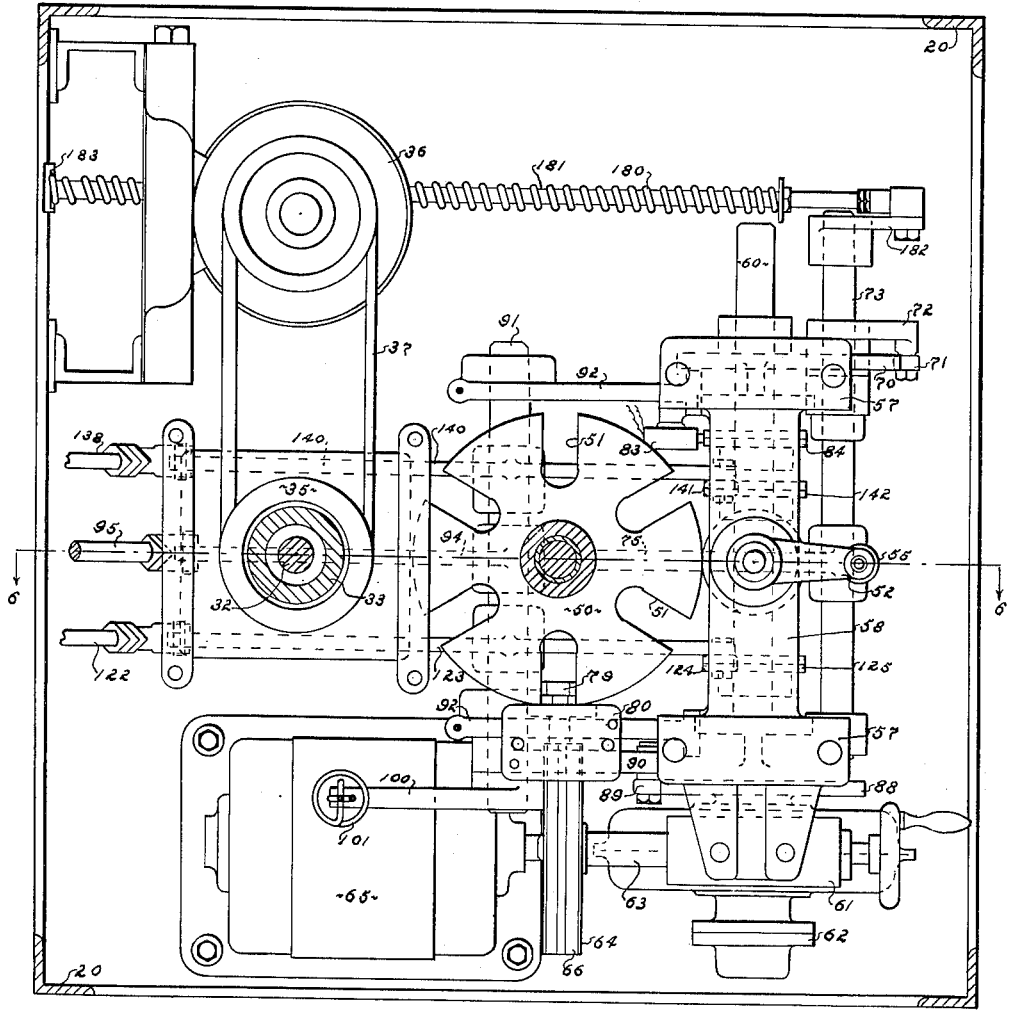
Figure 4 is a top plan view of the structure arranged in the cabinet portion of the machine with the top plate of the cabinet removed.

A Geneva disk 50, Figure 4, is fixed to the lower end portion of the shaft 26 and is provided with slots 51 corresponding to each of the mould carrying members. A crank arm 52, Figure 6, is fixed to the upper end of a shaft 53 journalled in a housing 54, the arrangement being such that upon rotation of the shaft 53 a roller 55 is moved into and out of engagement with the slots 51 and while in engagement with a slot being operable to effect rotation of the disk 50 through an angular movement equivalent to the spacing between the slots, as will be well understood.

Figure 2:
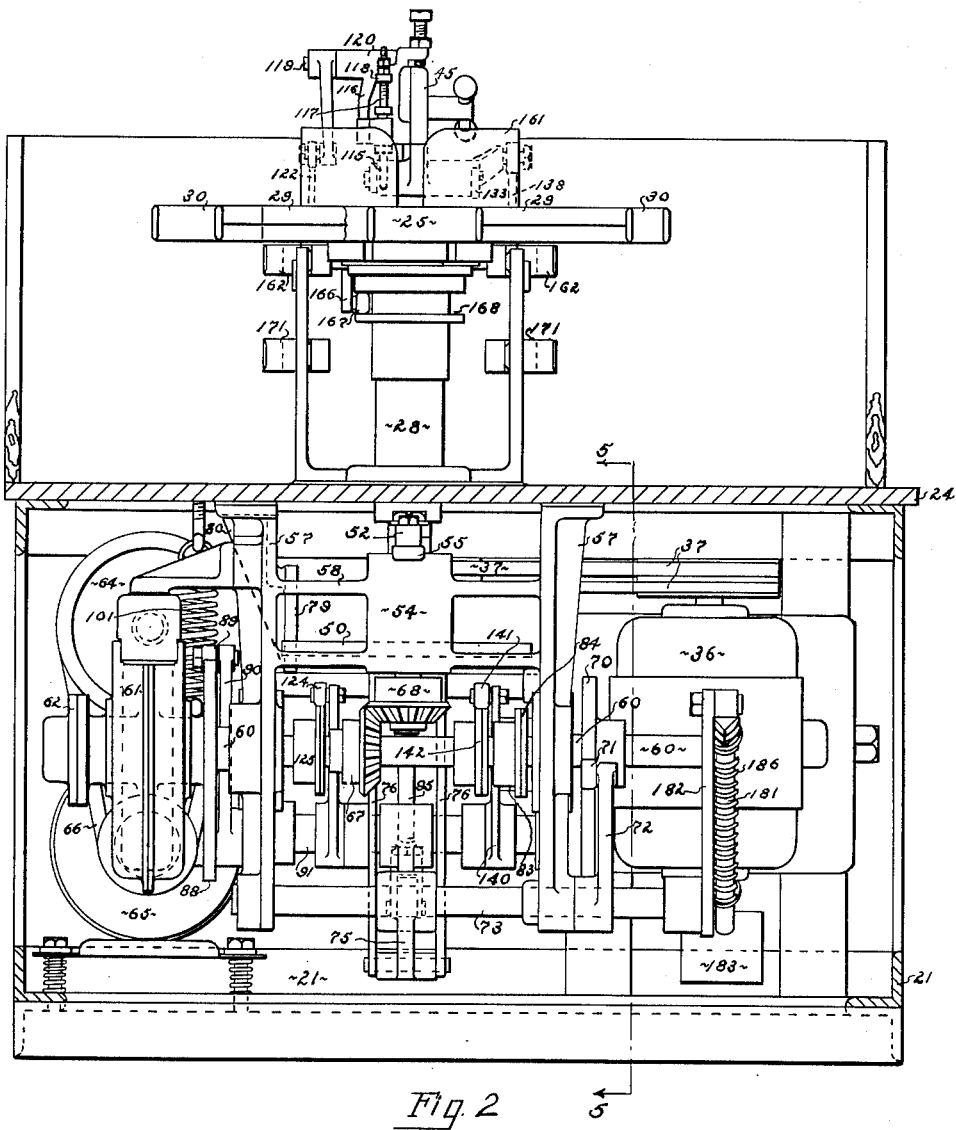
Figure 2 is a side elevational view of the machine looking toward the top of Figure 1 with the side panel of the cabinet removed.

The housing 54 consists of part of an H-shaped bracket, the side legs 57 of which are attached to and depend from the top plate 24, the cylindrical housing portion 54 being supported by webs 58 extending transversely between the legs 57, see Figures 2, 4 and 5.

There is horizontally journalled in the leg portions 57 a cam shaft 60, one end of which is operatively connected through reduction gearing mounted in a housing 61 through means of an overload clutch 62 to a shaft 63. This shaft is provided with a sheave 64 operatively connected to a driving motor 65 by a belt 66.

A miter gear 67, Figure 6, is affixed to the shaft 60 and arranged in mesh with a mating gear 68 fixed to the lower end of the shaft 53. The shafts 53, 60, rotate continuously. The turret shaft 26 is movable axially in the bearings 28. During the jiggering operation, this shaft is in its lowered position, as shown in Figures 2 and 6, and in this position the Geneva disk 50 is located a considerable distance below the plane in which the crank roller 55 is rotated. At this time, the mould carrying members are positioned so that the moulds carried thereby are below the top edge of the chuck 34 and the mould carried by the carrying member, then positioned in axial registration with the chuck, is carried by the chuck and is out of engagement with that mould carrying member, whereby the mould may be freely rotated by the chuck without any interference from the mould carrying members.

The turret shaft 26 is reciprocated axially by a cam 70 mounted on the shaft 60, the periphery of the cam being engaged by a roller 71 journalled on the end of an arm 72, the opposite end of which is fixed to a shaft 73 journalled in the depending side members 57 of the supporting bracket, see Figures 2 and 5. An arm 75 is fixed to the shaft 73 intermediate the side members 57 and is pivotally connected at its opposite end to a pair of links 76, the upper ends of which are secured to a collar 77 journalled on the lower end of the turret shaft 26. The cam 70 and the linkage actuated thereby is sufficient to elevate the shaft 26 to move the turret 25 from the position shown in Figure 2 to the position shown in Figure 3.

Figure 3:
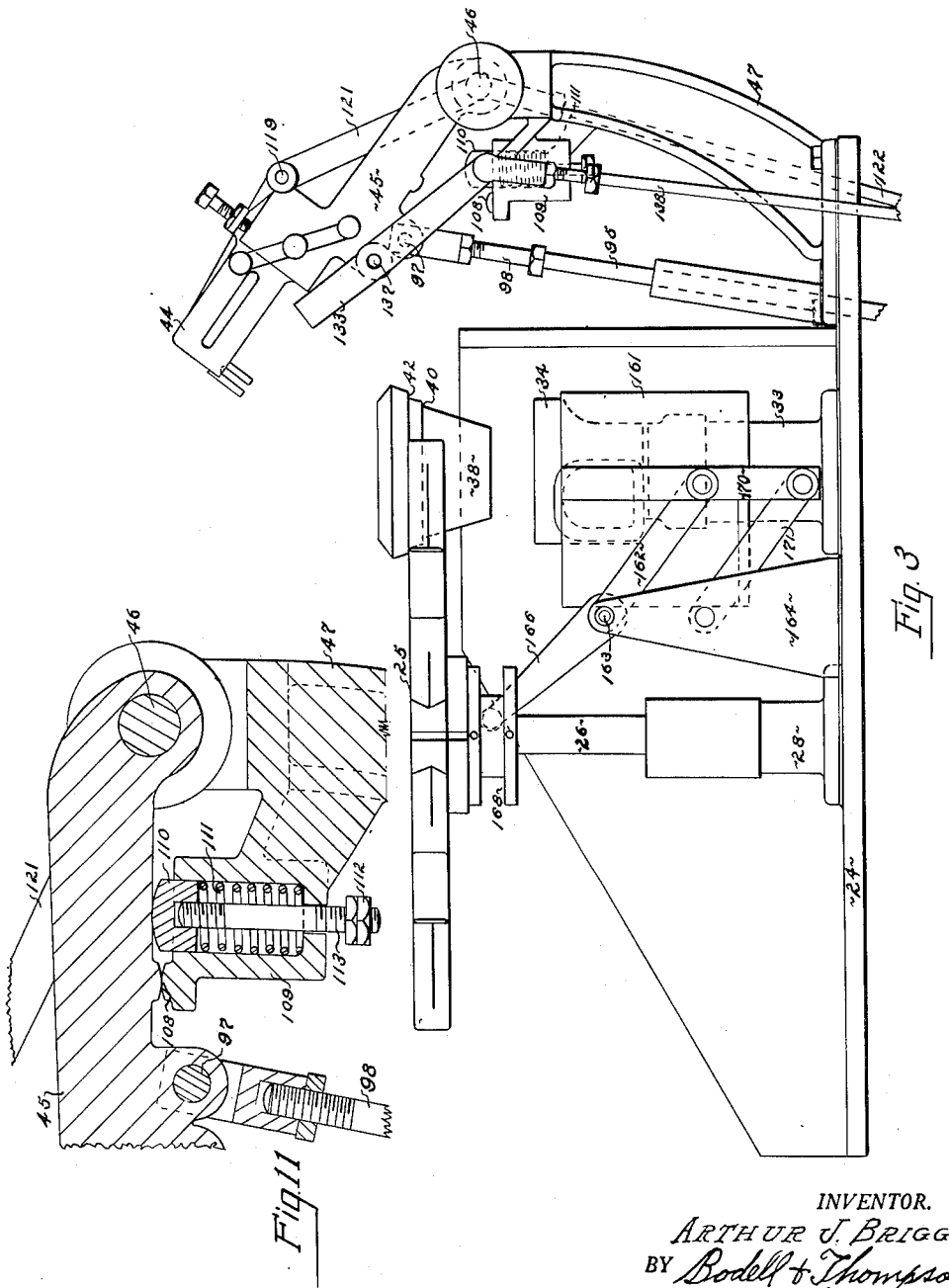
Figure 3 is a side elevational view of the top portion of the machine showing the tool arm in raised position and the guard in lowered position and with the mould carrying turret in elevated position.

In elevated position, shown in Figure 3, the moulds carried by the turret are moved in a plane above the chuck 34 and when so elevated the Geneva disk 50 is positioned to be engaged by the crank roller 55 to effect indexing of the disk and the turret. As the turret is elevated, the mould carrying members positioned in registration with the mold chuck 34 engages the mould carried by the chuck and raises it out of the chuck. Accordingly, the turret is indexed and the moulds are moved successively to and from the chuck during the time the turret is in elevated position.

As each mould carrying member is so moved into registration with the jiggering chuck, the cam 70 effects or permits downward movement of the turret to place a mould in the chuck. In order that the turret will be effectively restrained from any rotation during this downward movement, a detent bar 79, Figure 4, is affixed to a bracket 80 depending from the under side of the top plate 24, this detent bar being positioned to enter one of the slots 51 in the turret disk 50 during vertical reciprocation of the turret. This arrangement is such that the turret is raised at the top of its upward movement before the indexing of the turret takes place, and the turret is locked against rotation just prior to the seating of the moulds into the chuck and the removal of the moulds therefrom, whereby accurate registration between the moulds and the chuck 34 is obtained.

After the turret has descended sufficiently to place the moulds in the chuck, the turret jigger spindle motor 36 is energized through a circuit including a switch 83 actuated by a cam 84 also mounted on the shaft 60, see Figure 4, the cam 84 being of such contour as to keep the switch for the motor 36 closed during a portion of the time that the turret 25 is in lower position. This motor is of the type provided with a braking arrangement controlled from its power circuit and effective to reduce the speed of the motor quickly and bring it and the jigger spindle to a stop prior to the engagement of the mould carrying members with the mould on the upward movement of the turret. It will be understood that other braking structure may be employed to effect cessation of rotation of the jigger spindle.

During rotation of the mould, the forming tool is lowered into engagement with the material carried by the mould, this being accomplished by effecting counter-clockwise rotation, Figures 3 and 5, of the tool carrying arm 45 about its pivot 46. This is accomplished by a cam 88 mounted on the shaft 60, Figure 6. The periphery of this cam is engaged by a roller 89 mounted on an arm 90 fixed to one end of a shaft 91 journalled horizontally in a bracket 92 supported partially by the main bracket in which shaft 60 is journalled and by rods 93 depending from the top plate 24, see Figure 6. The shaft 91 has affixed to it an arm 94, to the opposite end of which is pivotally connected a link 95 extending upwardly through an aperture 96 formed in the top plate 24 and being connected to the arm 45, Figure 3, as at 97, through an adjustable connection 98. The shaft 91 has affixed to it an arm 100, the free end of which is connected to a helical tension spring 101 depending from the top plate 24.

The purpose of the spring 101 is to effect counter-clockwise rotation of the shaft 91, Figure 6, to move the tool arm 45 upwardly, as shown in Figure 3, the cam 88 being effective to move the tool arm downwardly to cause the tool carried thereby to engage the plastic material carried by the mould during rotation of the chuck 34.

The tool arm 45 is moved downwardly against a fixed stop 108, Figure 3, carried by a projection 109 formed integral with the bracket 47. Prior to the engagement of the arm 45 with the stop 108, the arm engages a member 110 slidably mounted in the projection 109, the downward movement of the member 110 being against a helical compression spring 111. The upward movement of the member 110 is limited by nuts 112 threaded on stem 113. This arrangement is effective to cushion the engagement of the tool arm with the stop 108 and prevent any jar or chatter at the end of the tool movement.

During the tooling operation, moisture is applied to the plastic material by a nozzle 115, Figures 1 and 2, mounted on an arm 116 fixedly secured to the tool arm 45. The nozzle 115 has a valve stem 117 which is actuated to open and closed position by an arm 118 fixed to a shaft 119 journalled in a bracket 120 also carried by the arm 45. The outer end of the shaft 119 is provided with a rearwardly extending arm 121 connected to a link 122, the lower end of which is pivotally connected to a lever 123, Figure 6, journalled on the shaft 91 and being provided at its opposite end with a roller 124, Figure 2, operating on a cam 125 mounted on the shaft 60. This arrangement is such as to actuate the stem 117 to open position during the tooling operation. The construction and operation of the water applicator is described in greater detail in my copending application, Ser. No. 111,033, filed August 18, 1949.

At the conclusion of the tooling operation, a scrapping device is moved into juxtaposition to the mould and functions to remove any excess material from the rim of the mould resulting from the jiggering or forming operation.

When hollow ware is being produced on the machine, the scrapper is of the form of a U-shaped member 130 having a wire 131 attached to the ends of the member. The U-shaped member 130 is fixed to a plate 132 adjustably mounted on an arm 133, as by means of bolts 134 cooperating with vertically extending slots 135, see Figure 9. The arm 133 is pivotally mounted, as at 137, Figure 5, and has connected to its rear end a link 138 extending downwardly and being connected to an arm 140 pivoted on the shaft 91 and having secured to its opposite end a roller 141, Figures 2 and 4, engaging a cam 142 affixed to the shaft 60.

Helical tension springs 143, Figures 5 and 6, depending from the housing 144, are connected to the rearwardly extending portions of arms 123, 140, yieldingly urging the links 122, 138, upwardly and maintaining the rollers 124, 141, of arms 123, 140, into engagement with the periphery of the respective actuating cams 125, 142, Figure 2.

The plate 132 is adjustably secured to the arm 133 and the cam 141 so adjusted as to move the wire 131 into engagement with the top edge of the mould when the forming tool has descended to the bottom of its movement and has formed the ware. The wire is effective to sever the scrap material from the ware and the mould, and the centrifugal force resulting from the rotation of the ware and mould by the spindle chuck discharges the scrapped clay from the mould.

In connection with flat ware production, as shown in Figure 8, the scrapper is in the form of a blade 150, Figure 10, secured to a holder 151 mounted for adjustment about a pivot 152 through a bracket 153. The bracket 153 is formed with an elongated slot 154 and is adjustably secured to a plate 155, as by bolts 156 extending through the slot 154 and through vertical slots 157 formed in the plate. The plate 155 is clamped by screw 160 to the exterior of sleeve 158 in arm 133 and is adjustable lengthwise or circumferentially of the sleeve.

A guard 161, Figures 1, 3 and 5, is provided to confine the discharge of scrap material from the mould. The guard 161 is formed of sheet material and is of U formation and mounted upon a pair of arms 162 fixed to a shaft 163 journalled in vertically arranged supports 164 extending upwardly from the table plate 24. The shaft 163 has affixed thereto intermediate the supports 164 an arm 166 extending forwardly and being provided at its outer end with a roller 167 arranged in a grooved collar 168 secured to the turret shaft 26.

The guard member is provided with depending braces 170, to the lower end of which there is pivotally connected links 171 journalled at their opposite ends to the supporting members 164, this arrangement constituting a parallelogram movement to effect vertical reciprocation of the guard. When the turret is elevated for indexing movement, the guard is moved downwardly below the top portion of the chuck 34, as shown in Figure 3. When the turret is moved downwardly to deposit a mould in the chuck, the guard is moved upwardly, as shown in Figure 5, and in this position is effective to confine scrap material discharged from the rotating mould and prevent scrap material from being deposited in or on a piece of finished ware in the next preceding mould on the turret, or on the next succeeding mould.

The moulds, with an amount of clay or plastic material arranged thereon or therein, may be placed in the mould carriers 30 and the moulds with the finished ware removed from the turret by the operator. It will be apparent that the structure described is particularly simple and compact. The arrangement is such that the entire cam shaft unit can be quickly and conveniently removed without disturbing other structures of the machine. The machine functions to produce ware of high quality free from chatter marks, or other imperfections. It will be observed that because of the vertical movement of the turret, the jigger spindle is rigidly mounted in the machine for rotation upon precision bearings. This adds materially to the high quality of the tooling on the ware, as distinguished from turret machines wherein the spindle has to be arranged for vertical movement.

The arrangement of the mould holders is such as to prevent radial displacement of the moulds and accordingly, the turret can be indexed at relatively high speed. However, during the vertical movement of the turret to effect the deposit of moulds in the chuck and removal of moulds therefrom, the turret is restrained against any rotation by the rugged detent structure 79. The turret is counterbalanced by a spring 180, Figures 2 and 4, encircling a rod 181, one end of which is connected to a crank arm 182 affixed to the shaft 73, the opposite end of the rod 181 being slidably mounted in a plate 183 affixed to one of the lower rails 21 of the frame. The spring functions to yieldingly urge the turret upwardly, or acts as a counterbalance to relieve strain on the actuating members and to effect a uniform smooth movement of the turret while it functions to deposit moulds in the chuck and to remove moulds therefrom.

What I claim is:

1. A pottery ware jigger for forming articles of plastic material on absorbent moulds comprising a frame, a jigger spindle journalled vertically in the frame and having a mould chuck at its upper end, a turret journalled on a vertical axis and being movable up and down on said axis and having a plurality of mould carrying members adapted to releasably support moulds, means operable as each mould carrying member is positioned in axial registration with said chuck to lower the turret to deposit a mould carried by said member in said chuck for rotation thereby and to subsequently elevate said turret to cause said mould carrying member to engage the mould and remove the same from the chuck, an actuating disk connected to said turret, a vertically extending stop member fixedly mounted on the frame, said disk having slidable interlocking engagement with said stop member during vertical movement of the turret except during the uppermost elevated position of said turret, indexing means operable when said turret is in uppermost elevated position to effect intermittent rotation of the turret to successively move said mould carrying members into axial registration with said chuck.

2. A pottery ware jigger for forming articles of plastic material on absorbent moulds comprising a frame, a jigger spindle journalled vertically in the frame and being restrained against axial movement, a mould chuck mounted on the upper end of said spindle, a turret journalled on a vertical axis and being movable upwardly and downwardly on said axis, a plurality of mould carrying members mounted on said turret and adapted to releasably support moulds, means operable as each mould carrying member is positioned in axial registration with said chuck to lower the turret to deposit a mould carried by said member in the chuck for rotation thereby and to subsequently elevate said turret to cause said member to engage the mould and remove the same from the chuck, a Geneva disk associated with said turret and being formed with a plurality of radial slots, an actuating crank member cooperable with said slots to effect intermittent rotation of the disk and turret, a detent member carried by the frame and extending into one of said slots during axial movement of the turret, said disk being movable with the turret out of engagement with said detent when the turret is in elevated position.

3. A pottery ware jigger for forming articles of plastic material on absorbent moulds comprising a frame, a spindle journalled vertically in the frame and having a mould chuck at its upper end, a mould carrier mounted on the frame for lateral movement in a plane above said chuck into and out of axial registration therewith and being adapted to releasably support a mould, means cooperable while said carrier is positioned in axial registration with the chuck to move the carrier downwardly to deposit a mould on the chuck and subsequently to move said carrier upwardly to remove the mould from the chuck, means operable to effect rotation of the spindle during a portion of the time the mould is positioned in the chuck, a forming tool, actuating means operable to move said tool into engagement with the material on the mold during rotation of the chuck, and a vertically extending detent means slidably engaged by said mould carrier during vertical movement thereof and cooperable to restrain the lateral movement of the carrier while positioned below said chuck.

4. A jigger for forming pottery ware on absorbent moulds comprising a frame, a jigger spindle journaled in the frame on a vertical axis and having a mould chuck fixed to its upper end, a turret journaled on a vertical axis and being provided with a plurality of radially extending arms, each arm having a mould carrying member at its outer end adapted to releasably support a mould, means operable to effect intermittent rotation of said turret in a plane above said chuck to move said mould carriers successively into axial registration with the chuck, means operable while each mould carrier is positioned in axial registration with the chuck to move said turret downwardly to deposit a mould carried by a mould carrier member into the chuck and to subsequently move said turret upwardly to remove the mould from the chuck, power means operable to effect rotation of the spindle and chuck while a mould is positioned in the chuck, a forming tool movable into engagement with the plastic material on the mould and operable to form the material into a piece of ware, a curved guard member formed of imperforate material mounted on the frame intermediate said turret and spindle, said guard being normally positioned below said chuck and said mould carrying members, linkage operatively connected to the turret and said guard to effect upward movement of the guard to a position intermediate said turret and chuck, and extending above the top of a mould positioned therein upon downward movement of the turret and said guard being formed with a notch in its upper edge portion for reception of the turret arms.

5. A pottery ware jigger for forming articles of plastic material on absorbent moulds comprising a frame member, a jigger spindle journaled in the frame member for rotation about a vertical axis and having a mould chuck at its upper end, a tool arm member pivotally mounted to the frame member on a horizontal axis, a forming tool carried by the arm member, power operated cam actuating means connected to the arm member and operable to effect movement thereof about said pivot to move the tool toward said chuck and into engagement with a material on a mould carried by the chuck, a fixed stop carried by the frame member and arranged for engagement by said arm member upon the completion of its movement toward the chuck, a movable element carried by one of said members and arranged for engagement by said other member prior to engagement of the tool with the plastic material, and spring means cooperable with said movable element to yieldingly oppose movement of said arm member and tool.

6. A pottery ware jigger for forming articles of plastic material on absorbent moulds comprising a frame member, a jigger spindle journaled in the frame member for rotation about a vertical axis and having a mould chuck at its upper end, a tool arm member pivotally mounted to the frame member on a horizontal axis, a forming tool carried by the arm member, power operated cam actuating means connected to the arm member and operable to effect movement thereof about said pivot to move the tool toward said chuck and into engagement with material on a mould carried by the chuck, a fixed stop carried by the frame member and arranged for engagement by said arm member upon completion of its movement toward the chuck, a movable element carried by said frame member and arranged for engagement by said tool arm member prior to engagement of the tool with the plastic material, and spring means cooperable with said movable element to yieldingly oppose movement of said arm member and tool.

ARTHUR J. BRIGGS.

REFERENCES CITED

The following references are of record in the file of this patent:

UNITED STATES PATENTS

| Number | Name | Date |
|---|---|---|
| 641,072 | Briggs | Jan. 9, 1900 |
| 644,811 | Sylvester | Mar. 6, 1900 |
| 1,268,984 | McCormick | June 11, 1918 |
| 1,605,847 | McDonald et al. | Nov. 2, 1926 |
| 2,201,244 | Root | May 21, 1940 |
| 2,335,123 | Kinnard | Nov. 23, 1943 |
| 2,392,399 | Miller | Jan. 8, 1946 |
| 2,474,509 | Allen | June 28, 1949 |

FOREIGN PATENTS

| Number | Country | Date |
|---|---|---|
| 579,291 | Great Britain | July 30, 1946 |